United States Patent
Xue et al.

(10) Patent No.: US 10,342,019 B2
(45) Date of Patent: Jul. 2, 2019

(54) UE DISCOVERY METHOD AND SYSTEM IN D2D NETWORK

(71) Applicant: Samsung Electronics Co., Ltd., Suwon-si, Gyeonggi-do (KR)

(72) Inventors: Peng Xue, Hwaseong-si (KR); Hyun-Seok Ryu, Yongin-si (KR); Seung-Hoon Park, Seoul (KR); Sang-Won Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 86 days.

(21) Appl. No.: 15/322,663

(22) PCT Filed: Feb. 5, 2016

(86) PCT No.: PCT/KR2016/001300
§ 371 (c)(1),
(2) Date: Dec. 28, 2016

(87) PCT Pub. No.: WO2016/126136
PCT Pub. Date: Aug. 11, 2016

(65) Prior Publication Data
US 2017/0142703 A1    May 18, 2017

(30) Foreign Application Priority Data
Feb. 6, 2015 (KR) .................. 10-2015-0018739

(51) Int. Cl.
*H04W 4/00* (2018.01)
*H04W 72/04* (2009.01)
(Continued)

(52) U.S. Cl.
CPC ......... *H04W 72/048* (2013.01); *H04W 8/005* (2013.01); *H04W 48/08* (2013.01);
(Continued)

(58) Field of Classification Search
None
See application file for complete search history.

(56) References Cited

U.S. PATENT DOCUMENTS

2014/0051426 A1* 2/2014 Siomina ............ H04W 36/0088
455/422.1
2014/0335853 A1  11/2014 Sartori et al.
(Continued)

FOREIGN PATENT DOCUMENTS

WO    2014/130156 A1    8/2014

OTHER PUBLICATIONS

LG Electronics, "Details of Resource Allocation for D2D Synchronization," 3GPP TSG RAN WG1 Meeting #78bis, Oct. 6-10, 2014, R1-144014, Ljubljana, Slovenia.
(Continued)

*Primary Examiner* — Farah Faroul
(74) *Attorney, Agent, or Firm* — Jefferson IP Law, LLP

(57) ABSTRACT

A 5G or pre-5G communication system for supporting a higher data transmission rate beyond a 4G communication system such as long-term evolution (LTE) is provided, including a method for performing device to device (D2D) discovery by a user equipment (UE), which is out of the coverage area serviced by a base station, in a wireless communication network. The method includes the operations of receiving pre-configuration information for transmitting a discovery message, and transmitting the discovery message in a transmission resource determined on the basis of the pre-configuration information, wherein the pre-configuration information includes a list of pools for transmitting the discovery message, and the transmission resource is determined from the list of pools.

15 Claims, 13 Drawing Sheets

(51) Int. Cl.
*H04W 48/08* (2009.01)
*H04W 56/00* (2009.01)
*H04W 8/00* (2009.01)
*H04W 76/14* (2018.01)
*H04W 72/02* (2009.01)

(52) U.S. Cl.
CPC ......... *H04W 56/00* (2013.01); *H04W 56/001* (2013.01); *H04W 72/0446* (2013.01); *H04W 72/0453* (2013.01); *H04W 76/14* (2018.02); *H04W 72/02* (2013.01)

(56) References Cited

U.S. PATENT DOCUMENTS

| | | | | |
|---|---|---|---|---|
| 2014/0376458 | A1* | 12/2014 | Ryu | H04W 72/085 370/329 |
| 2015/0056982 | A1* | 2/2015 | Sorrentino | H04W 60/00 455/426.1 |
| 2015/0264677 | A1* | 9/2015 | He | H04W 72/02 370/312 |
| 2015/0282036 | A1* | 10/2015 | Yi | H04L 5/001 370/332 |
| 2015/0327201 | A1* | 11/2015 | He | H04W 48/16 370/336 |
| 2015/0327312 | A1* | 11/2015 | Burbidge | H04W 72/14 370/329 |
| 2016/0088607 | A1* | 3/2016 | Sorrentino | H04W 52/0229 370/329 |
| 2016/0095131 | A1* | 3/2016 | Seo | H04W 72/085 370/329 |
| 2016/0100401 | A1* | 4/2016 | Xiong | H04W 76/10 455/450 |
| 2016/0337839 | A1* | 11/2016 | Chae | H04W 76/14 |
| 2016/0344469 | A1* | 11/2016 | Yi | H04W 76/14 |
| 2017/0005850 | A1* | 1/2017 | Chae | H04L 27/2613 |
| 2017/0034687 | A1* | 2/2017 | Yu | H04W 72/04 |
| 2017/0055311 | A1* | 2/2017 | Van Phan | H04W 76/23 |
| 2017/0105236 | A1* | 4/2017 | Chandramouli | H04W 76/10 |
| 2017/0230938 | A1* | 8/2017 | Huang | H04W 76/10 |
| 2017/0295602 | A1* | 10/2017 | Yu | H04W 76/023 |

OTHER PUBLICATIONS

Ericsson et al., "WF on Pools Configuration," 3GPP TSG RAN WG1 Meeting #78, R1-143455, Dresden.

LG Electronics, "Remaining Issues on Resource Allocation and Repetition Transmission for Discovery," 3GPP TSG RAN WG1 Meeting #78bis, Oct. 6-10, 2014, R1-144026, Ljubljana, Slovenia.

Interdigital Communications, "Multiple Transmission Pools for ProSe Communications," 3GPP TSG-RAN—WG2 #88, Nov. 17-21, 2014, R2-145204, San Francisco, USA.

* cited by examiner

UE DISCOVERY METHOD AND SYSTEM IN D2D NETWORK

CROSS-REFERENCE TO RELATED APPLICATION(S)

This application is a National Phase Entry of PCT International Application No. PCT/KR2016/001300, which was filed on Feb. 5, 2016, and claims a priority to Korean Patent Application No. 10-2015-0018739, which was filed on Feb. 6, 2015, the contents of which are incorporated herein by reference.

TECHNICAL FIELD

The present disclosure relates to a user equipment (UE) discovery method and system and, more specifically, to a UE discovery method and system in a device-to-device (D2D) network.

BACKGROUND ART

In order to meet wireless data traffic demands that have increased since $4^{th}$ Generation (4G) communication system commercialization, efforts are being made to develop an improved fifth-generation (5G) communication system or a pre-5G communication system. For this reason, the 5G communication system or the pre-5G communication system is called a beyond 4G network communication system or a post LTE system.

In order to achieve a high data transmission rate, an implementation of the 5G communication system in an mmWave band (for example, 60 GHz band) is being considered. To mitigate the path loss of a radio wave and increase the transmission distance of a radio wave in the mmWave band, technologies such as beamforming, massive MIMO, Full Dimensional MIMO (FD-MIMO), an array antenna, analog beam-forming, and a large scale antenna are under discussion for the 5G communication system.

Further, technologies such as an evolved small cell, an advanced small cell, a cloud Radio Access Network (cloud RAN), an ultra-dense network, Device to Device communication (D2D), a wireless backhaul, a moving network, cooperative communication, Coordinated Multi-Points (CoMP), and interference cancellation have been developed to improve the system network in the 5G communication system.

In addition, in the 5G system, Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA) have been developed.

A description of a general D2D discovery operation scenario is as follow.

In an LTE system, sidelink transmission (known as Device to Device transmission or D2D transmission) may be performed in an uplink frequency spectrum (in the case of a frequency division duplex (FDD) or an uplink subframe (in the case of a time division duplex (TDD)).

The sidelink transmission is restricted to a subset of an uplink resource, i.e., a subset of a subframe in a time domain or a subset of a resource block (RB) in a frequency domain.

The sidelink transmission may provide two types of proximity based services (ProSe), i.e., direct discovery and direct communication.

FIG. 1 illustrates a scenario in which UEs inside two neighboring cells discover each other.

In ProSe discovery, mutually neighboring UEs may discover each other. As illustrated in FIG. 1, a UE-4 100 in a first cell 110 may discover a UE-5 102 in the identical cell as well as a UE-3 104 in a neighboring cell 120.

Each UE may transmit a discovery message by using a discovery resource in a discovery resource pool configured by a network, and may receive a discovery message transmitted from another UE in the identical cell or a neighboring cell.

Two types of discovery procedures may be defined according to how a resource is allocated. A first type of discovery procedure is a procedure in which each UE selects a discovery resource on the basis of a rule predefined for the each UE. A second type of discovery procedure is a procedure in which a resource for discovery message transmission is allocated to each UE by a base station (eNB).

Synchronization is a prerequisite for the sidelink transmission. In order to make synchronization between UEs possible, each eNB may configure some synchronization resources for the transmission of Sidelink Synchronization Signal (SLSS) or a Sidelink Synchronization Sequence (SSS) on a fixed period (e.g. 40 ms) basis, and may configure some indispensible system information.

Each cell has an SLSS specific to itself, and the SLSS may include a primary SLSS and a secondary SLSS.

The eNB may instruct a UE to transmit an SLSS, and a UE, which satisfies a predefined triggering condition, may transmit an SLSS.

The transmitted SLSS may be used to acquire time and frequency synchronization for sidelink transmission or reception by a UE. Further, SLSS transmission in one cell may allow UEs in a neighboring cell to be synchronized with the one cell so that the UEs discover each other.

System information for sidelink transmission may be derived from a parameter, which is signaled from an eNB, and may be derived from a pre-configured parameter.

In the above-described D2D discovery, the following item becomes an issue.

Even when network coverage is not available, for example, at the time of the occurrence of network failure, at the time of the occurrence of attenuation due to a local environment, or at the time of the occurrence of simple lack of coverage, ProSe discovery maintenance capacity should be guaranteed. In particular, the ProSe discovery maintenance capacity is required to be guaranteed for the purpose of public safety.

FIG. 2 illustrates D2D discovery in an out-of-coverage scenario and a partial coverage scenario.

In FIG. 2, when a network (i.e. eNB 200) is not available, it is required to consider a method for enabling discovery between out-of-coverage (OOC) UEs (e.g. UE-1 202 and UE-2 204) and a method for enabling discovery between an out-of-coverage UE (e.g. UE-3 206) and an in-coverage (IC) UE (e.g. UE-4 212 or UE-5 214) (i.e., partial coverage scenario).

DETAILED DESCRIPTION OF THE INVENTION

Technical Problem

Therefore, it is required to design a method, a solution, or a system, which enables ProSe discovery in an out-of-coverage scenario and a partial coverage scenario.

Accordingly, the present disclosure provides a ProSe discovery pre-configuration method, a synchronization procedure, and a method for discovery between an in-coverage UE and an out-of-coverage UE and a system therefor.

Technical Solution

The present disclosure proposes a method for performing a device to device (D2D) discovery by a user equipment (UE) existing outside coverage in which a service is provided by a base station in a wireless communication network, the method including: receiving pre-configuration information for the transmission of a discovery message; and transmitting the discovery message in a transmission resource determined based on the pre-configuration information, wherein the pre-configuration information includes a pool list for the discovery message transmission and the transmission resource is determined from the pool list.

The present disclosure proposes a user equipment (UE) existing outside the coverage in which a service is provided by a base station in a wireless communication network, the UE including: a controller that controls to receive pre-configuration information for the transmission of a discovery message and to transmit the discovery message in a transmission resource determined based on the pre-configuration information; and a transceiver that receives the pre-configuration information by a control of the controller and transmits the discovery message, wherein the pre-configuration information includes a pool list for the discovery message transmission and the transmission resource is determined from the pool list.

Further, the present disclosure proposes a method for performing a device to device (D2D) discovery by a user equipment (UE) in a wireless communication network, the method including: receiving a message including pre-configuration information for D2D discovery message transmission; determining to operate as a synchronization reference UE when an instruction is received from a base station or a predefined condition is satisfied; in a transmission resource determined based on the pre-configuration information, transmitting a synchronization signal used to acquire time and frequency synchronization and transmitting system information including transmission timing information of a discovery message; and transmitting the discovery message in the transmission resource determined based on the pre-configuration information. Alternatively, the pre-configuration information includes at least one among the number of times of retransmission of a discovery message, the number of times of subframe bitmap during one discovery period, and information indicating a discovery offset. Alternatively, the predefined condition is determined by a combination of at least one of whether the UE is inside network coverage and whether a reference signal received power (RSRP) of a received synchronization signal is less than a threshold value included in the pre-configuration information. Alternatively, the UE is an in-coverage UE or an out-of-coverage UE. Alternatively, the method further includes receiving configuration information of a resource pool, which is to be used for the transmission of the synchronization signal, the system information, and the discovery message, through a system information block (SIB) 19. Alternatively, the method further includes reporting, when a second synchronization signal is received from an out-of-coverage UE, the reception of the second synchronization signal to the base station. Alternatively, the method further includes: receiving, from the base station, reconfiguration information of a resource pool to be used for the transmission of the synchronization signal, the system signal, and the discovery message; and transmitting at least one of the synchronization signal, the system signal, and the discovery message by using a resource pool determined based on the reconfiguration information. Alternatively, when a synchronization reference UE, which the UE has, is an in-coverage UE, an ID of the transmitted synchronization signal is configured to be identical to an ID of a synchronization signal of the synchronization reference UE. Alternatively, when a synchronization reference UE, which the UE has, is not an in-coverage UE, an ID of the transmitted synchronization signal is selected from a synchronization signal ID set for an out-of-coverage case.

Further, the present disclosure proposes a user equipment (UE) for performing a device to device (D2D) discovery in a wireless communication network, the UE including: a controller that controls to receive a message including pre-configuration information for D2D discovery message transmission, determine to operate as a synchronization reference UE when an instruction is received from a base station or a pre-defined condition is satisfied, transmit a synchronization signal used to acquire time and frequency synchronization in a transmission resource determined based on the pre-configuration information, transmit system information including transmission timing information of a discovery message, and transmit the discovery message in the transmission resource determined based on the pre-configuration information; and a transceiver that transmits or receives the message, the instruction, the synchronization signal, the system information, and the discovery message by a control of the controller. Alternatively, the pre-configuration information includes at least one of the number of times of retransmission of a discovery message, the number of times of subframe bitmap during one discovery period, and information indicating a discovery offset. Alternatively, the predefined condition is determined by a combination of at least one of whether the UE is inside network coverage and whether a reference signal received power (RSRP) of a received synchronization signal is less than a threshold value included in the pre-configuration information. Alternatively, the UE is an in-coverage UE or an out-of-coverage UE. Alternatively, the controller is configured to receive configuration information of a resource pool, which is to be used for the transmission of the synchronization signal, the system signal, and the discovery message, through a system information block (SIB) 19. Alternatively, the controller further performs reporting, when a second synchronization signal is received from an out-of-coverage UE, the reception of the second synchronization signal to the base station. Alternatively, the controller is configured to: receive, from the base station, reconfiguration information of a resource pool to be used for the transmission of the synchronization signal, the system signal, and the discovery message; and transmit at least one of the synchronization signal, the system signal, and the discovery message by using a resource pool determined based on the reconfiguration information. Alternatively, when a synchronization reference UE, which the UE has, is an in-coverage UE, an ID of the transmitted synchronization signal is configured to be identical to an ID of a synchronization signal of the synchronization reference UE. Alternatively, when a synchronization reference UE, which the UE has, is not an in-coverage UE, an ID of the transmitted synchronization signal is selected from a synchronization signal ID set for an out-of-coverage case.

Advantageous Effects

The present disclosure can significantly increase the success rate of discovery between UEs in a partial coverage scenario in which an in-coverage UE and an out-of-coverage UE coexist.

The present disclosure provides a concrete method for synchronization which a UE should perform in advance for discovery, and therefore enables the UE to have a synchronization reference UE, which increases the success rate of discovery of the UE, and to better receive system information a signal required for the synchronization from the synchronization reference UE.

The present disclosure allows an out-of-coverage UE to successfully discover an in-coverage UE.

Further, the present disclosure can provide a detailed content related to parameters which should be reflected in a standard for a discovery operation.

MODE FOR CARRYING OUT THE INVENTION

Figure 1:
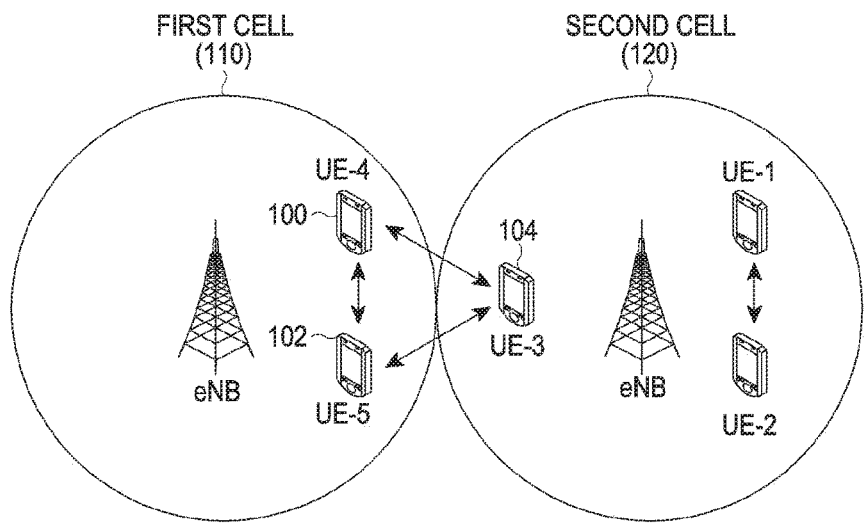
FIG. 1 illustrates a scenario in which UEs inside two neighboring cells discover each other.
Figure 2:
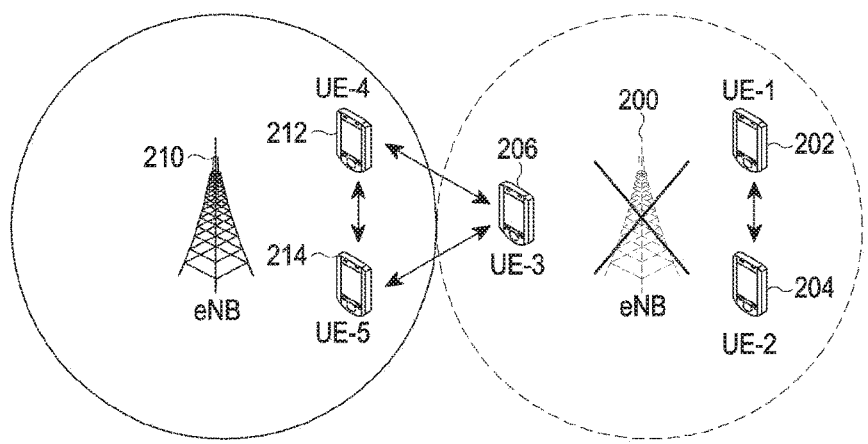
FIG. 2 illustrates D2D discovery in an out-of-coverage coverage and a partial coverage scenario.

Hereinafter, embodiments of the present disclosure will be described in detail with reference to the accompanying drawings. In the following description of the present disclosure, a detailed description of known configurations or functions incorporated herein will be omitted when it is determined that the detailed description may make the subject matter of the present disclosure unclear. The terms as described below are defined in consideration of the functions in the embodiments, and the meaning of the terms may vary according to the intention of a user or operator, convention, or the like. Therefore, the definitions of the terms should be made based on the contents throughout the specification.

In the detailed description of the present disclosure, an example of interpretable meanings of some terms used in the present disclosure is proposed. However, it is noted that the terms are not limited to the examples of the construable meanings which are proposed below.

A base station is a subject communicating with a User Equipment (UE), and may be referred to as a BS, a Node B (NB), an eNode B (eNB), an Access Point (AP), or the like.

The user equipment is a subject communicating with the base station, and may be referred to as a UE, a Mobile Station (MS), a Mobile Equipment (ME), a device, a terminal, or the like.

Direct discovery and direct communication, which are examples of ProSe, refer to discovery and communication, which are directly performed between UEs, respectively, and may be referred, hereinafter, to as "discovery" and "sidelink (sl) communication", respectively.

The in-coverage refers to "in the coverage of available eNB 210", and the partial coverage refers to a case where an in-coverage UE and an out-of-coverage UE coexist.

A. Pre-Configuration Method for ProSe Discovery

In order to allow a UE to perform a ProSe operation when the UE is outside a network coverage, the UE may be pre-configured to perform the ProSe operation, and the pre-configuration may be referred to as "ProsePreconfiguration".

The ProsePreconfiguration may be pre-configured in a Universal Integrated Circuit Card (UICC) (common IC card) or a mobile equipment (ME).

The ProsePreconfiguration may include at least one of configurations in Table 1, as described in 3rd generation partnership project (3GPP) technical specification (TS) 36.331.

TABLE 1

ProsePreconfigGeneral
    carrierFreq, freqBandIndicator, maxTxPower,
additionalSpectrumEmission, s1-bandwidth, tdd-SubframeAssignment,
reserved
   ProsePreconfigSync
    Sync-CP-Len, sync-OffsetIndicator1, sync-OffsetIndicator2,
sync-TxParameters, syncTxThreshOoC, filterCoefficient
   ProsePreconfigComm
    ProsePreconfigCommPoolList
      sc-CP-Len, sc-Period, sc-TF-ResourceConfig,
dataHoppingConfig, dataTxParameters, trpt-Subset In order to enable ProSe discovery when a UE is outside network coverage, "ProsePreconfigDisc", which is a ProSe discovery-related pre-configuration, may be added to ProsePreconfiguration. The ProsePreconfigDisc may include "ProsePreconfigDiscPoolList", which is a list of individual resource pools for discovery, as in Table 2.

TABLE 2

ProsePreconfigDiscPoolList
    cp-Len (cyclic prefix (CP) length)
    period (discovery period, {32, 64, 128, 256, 512, 1024} radio frame
    numRetx (Number of times of retransmission of discovery message, {0, 1, 2, 3})
    numRepetition (Number of times of occurrence of discoverySubframeBitmap, {1, . . . , 50})
    tf-ResourceConfig
        Indicate discovery offset (related to system frame number SFN#0), use resource in time domain (discoverySubframeBitmap), use resource in frequency domain (e.g. PRB start index, PRB end index, number of PRBs, etc.)
    tx-Parameters
        Prose-TxParameters
        poolSelectionConfig (select pool, based on RSRP or randomly)
        tx-Probability When a UE is outside network coverage, the UE may use at least a pre-configured resource pool in order to discover another UE.

In order to perform discovery when some UEs are inside coverage and other UEs are outside coverage, in relation to all UEs (i.e. all of in-coverage and out-of-coverage UEs), a resource pool for discovery should be configured, and the resource pool may be a union of a resource pool for discovery transmission/reception in a neighboring cell and a resource pool for out-of-coverage discovery transmission.

It should be noted that the ProsePreconfigSync included in ProsePreconfiguration may be commonly used for a sidelink communication and a discovery.

For example, parameters of a synchronization resource within the ProsePreconfigSync, i.e., sync-OffsetIndicator1 and sync-offsetIndicator2, may be different from each other with respect to sidelink communication and discovery. Alternatively, sync-OffsetIndicator1 may be common to the sidelink communication and the discovery, but syncOffsetIndicator2 may be different with respect to the sidelink communication and the discovery.

Further, syncTxThreshOoC within the ProsePreconfigSync may be different with respect to the sidelink communication and the discovery. This means that there may be sync TxThreshOoCComm and syncTxThreshOoCDisc for each of sidelink communication and discovery in an out-of-coverage scenario.

A particular synchronization parameter for the sidelink communication and the discovery allows synchronization between UEs, which communicate with each other, or synchronization between UEs, which discover each other, to be performed in a more efficient scheme.

B. Synchronization Procedure Between UEs for Performing Discovery

The purpose of a synchronization procedure is to provide synchronization information to a UE outside network coverage.

The synchronization information is provided by a UE operating as a synchronization reference (hereinafter, referred to as "SyncRef UE" or "synchronization reference UE") and may be transmitted in a synchronization resource configured by a network or in a pre-configured synchronization resource.

The SyncRef UE (synchronization reference UE) may transmit not only SLSS but also sidelink system information known as Master Information Block for Sidelink (MIB-SL). The MIB-SL may include a timing information and at least one addition configuration parameter which enables system information to be transmitted to an out-of-coverage LTE.

When a UE is inside network coverage, the content of the MIB-SL may be derived from a parameter which is signaled by an eNB.

When a UE is outside coverage and the UE selects another UE as a synchronization reference, the content of the MIB-SL may be derived from the received MIB-SL (i.e., parameter included in the MIB-SL). Otherwise, i.e. if there is no synchronization reference UE which has been selected by the out-of-coverage UE, the out-of-coverage UE may use a pre-configured parameter.

Figure 3A:
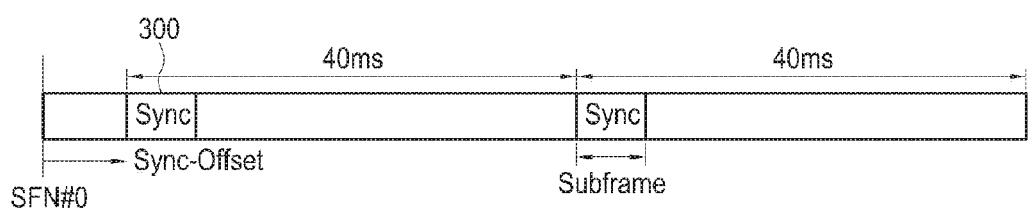
FIG. 3A illustrates sidelink synchronization resource allocation for an in-coverage operation according to the present disclosure.
Figure 3B:
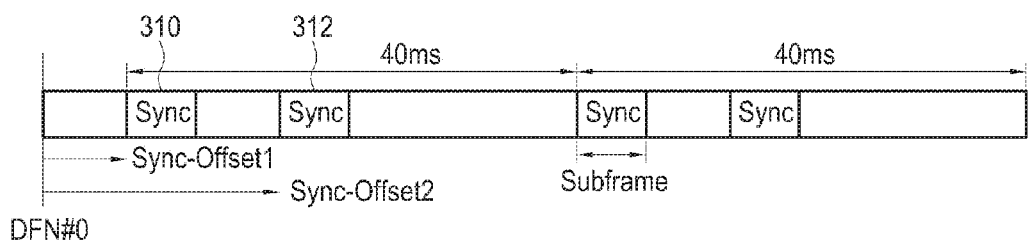
FIG. 3B illustrates sidelink synchronization resource allocation for an out-of-coverage operation according to the present disclosure.

FIGS. 3A and 3B illustrate examples of sidelink synchronization resources for in-coverage and out-of-coverage operations according to the present disclosure.

An example of synchronization resource allocation for the in-coverage operation is illustrated in FIG. 3A and an example for the out-of-coverage operation is illustrated in FIG. 3B.

In the in-coverage operation of FIG. 3A, there is one synchronization resource unit 300 every 40 ms. Information for the transmission of an SLSS and an MIB-SL may be provided by System Information Block Type 19 (SIB19).

In the out-of-coverage operation of FIG. 3B, there are two pre-configured synchronization resource units 310 and 312 every 40 ms. When a UE becomes a SyncRefUE, the UE receives an SLSS and an MIB-SL in one synchronization resource unit (e.g. 310), and transmits an SLSS and an MIB-SL in another synchronization resource unit (e.g. 312).

When an out-of-coverage UE discovers SLSS/MIB-SL from an in-coverage SyncRefUE and derives timing information, one (e.g. 312) of synchronization resource units for an out-of-coverage operation may be aligned with a synchronization resource unit for an in-coverage operation. Therefore, the aligned synchronization resource unit for the out-of-coverage operation may enable synchronization of the in-coverage and out-of-coverage UEs.

One synchronization resource unit may occupy one subframe in a time domain, and occupy six central resource blocks (RBs) in a frequency domain.

Figure 4:
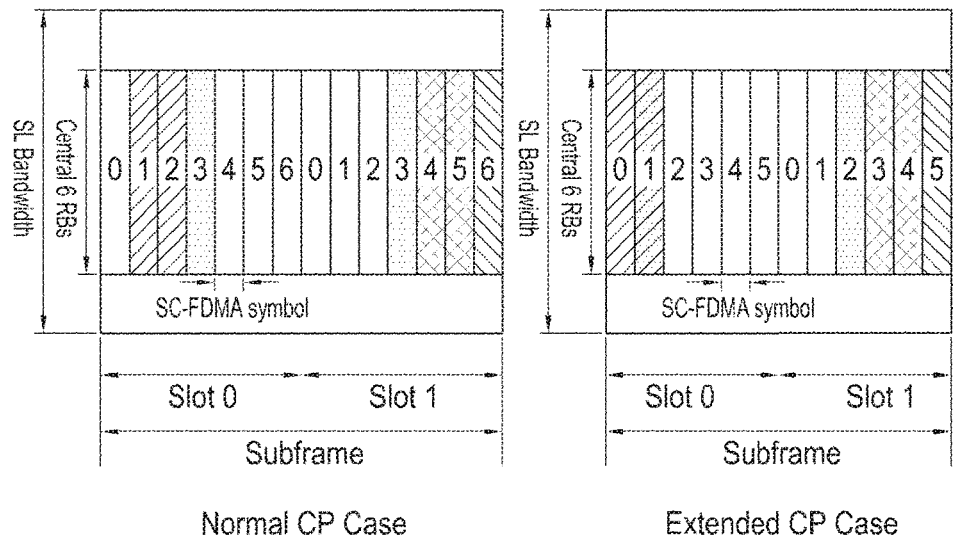
FIG. 4 illustrates the use of a symbol in a D2D synchronization resource according to the present disclosure.
Figure 4:
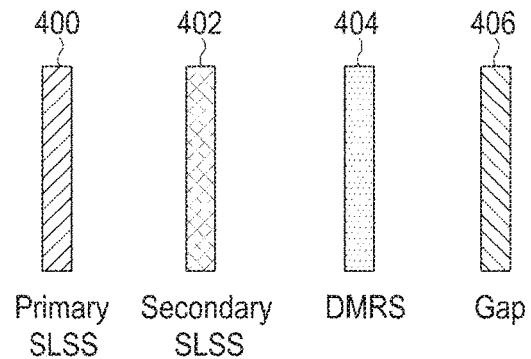

FIG. 4 illustrates the use of a symbol in a D2D synchronization resource according to the present disclosure.

FIG. 4 illustrates a normal CP case and an extended CP case.

During one synchronization resource unit occupying one subframe, a primary SLSS 400 may occupy two adjacent symbols, a secondary SLSS 402 may also occupy two adjacent symbols, and a last symbol may be used as a gap symbol 406. The remaining symbols may be used for MIB-SL transmission, and two of the remaining symbols may become a DMRS symbol 404. The DMRS symbol 404 is used in Demodulation Reference Signal (DMRS) transmission which assists channel measurement and data decoding.

1) SyncRef UE Initialization

Figure 5:
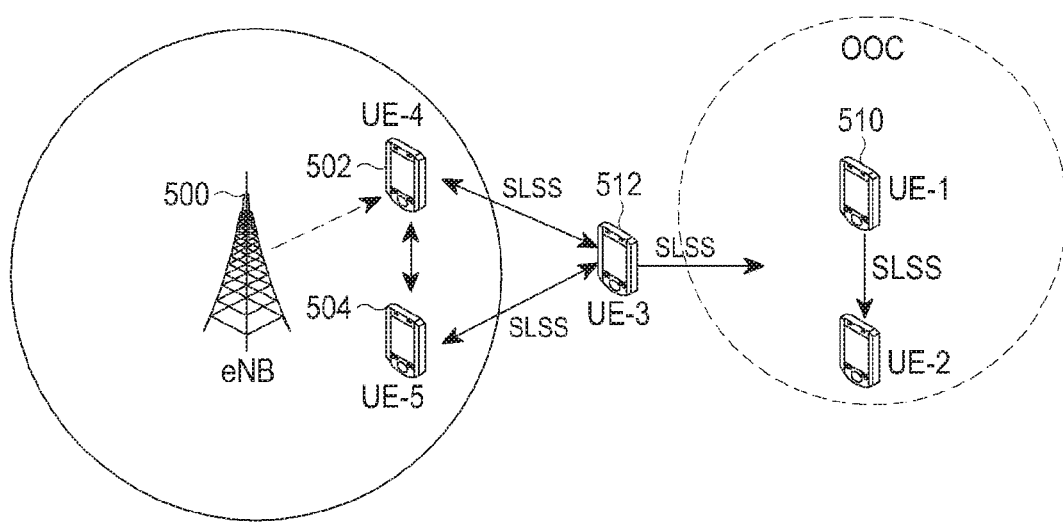
FIG. 5 illustrate D2D discovery synchronization in an out-of-coverage scenario and a partial coverage scenario according to the present disclosure.

FIG. 5 illustrate D2D discovery synchronization in an out-of-coverage scenario and a partial coverage scenario according to the present disclosure.

With respect to in-coverage UEs, an eNB 500 may instruct one UE to become a SyncRef UE and to transmit an SLSS. For example, the eNB may configure syncSourceControl, which is a synchronization reference indication parameter, for the SyncRef UE.

Alternatively, a threshold value of Reference Signal Received Power (RSRP) may be used in triggering SLSS transmission.

In other words, when the RSRP of a UE is less than a pre-configured threshold value (e.g. syncTxThreshIC), the UE may be become a SyncRef UE which will transmit an SLSS, because the UE is bound to be positioned at a cell edge.

In relation to FIG. 5, for an example, a UE-4 502 may be instructed to become a SyncRef UE by the eNB 500, and a UE-5 504 may also be triggered by a RSRP threshold value condition so as to become a SyncRef UE.

With respect to an out-of-coverage UE, an RSRP threshold value may be similarly defined so as to trigger SLSS transmission.

When the RSRP of a UE is less than a pre-configured threshold value (e.g. syncTxThreshOoC), the UE may transmit an SLSS. The synchTxThreshOoC may be included in the pre-configured ProSe parameters (e.g. ProsePreconfiguration).

In relation to FIG. 5, for an example, each of an out-of-coverage UE-1 510 and an out-of-coverage UE-3 512 may become a SyncRef UE triggered by a RSRP threshold value condition.

Therefore, when a direct discovery announcement is transmitted and conditions in Table 3 are satisfied, a UE capable of performing SLSS transmission may transmit an SLSS and an MIB-SL in a synchronization resource according to a predetermined rule.

TABLE 3

When a cell used in direct discovery transmission is proper, or the cell used in direct discovery transmission satisfies S-criteria (defined in 3GPP TS 36.304) and conditions for supporting direct discovery in a limited service state (defined in 3GPP 23.303):
    when syncSourceControl is configured and a value is configured as TRUE; or
    when syncSourceControl is not configured; syncTxThreshIC is included in SIB19; and RSRP measurement result of a cell used to transmit ProSe direct discovery announcement is less than a syncTxThreshIC value:
        Otherwise (i.e. out-of-coverage)
            syncTxThreshOoC is included in ProsePreconfiguration, and the RSRP measurement of all SLSSs, which have been discovered by the UE, is less than a syncTxThreshOoC value.

Figure 6:
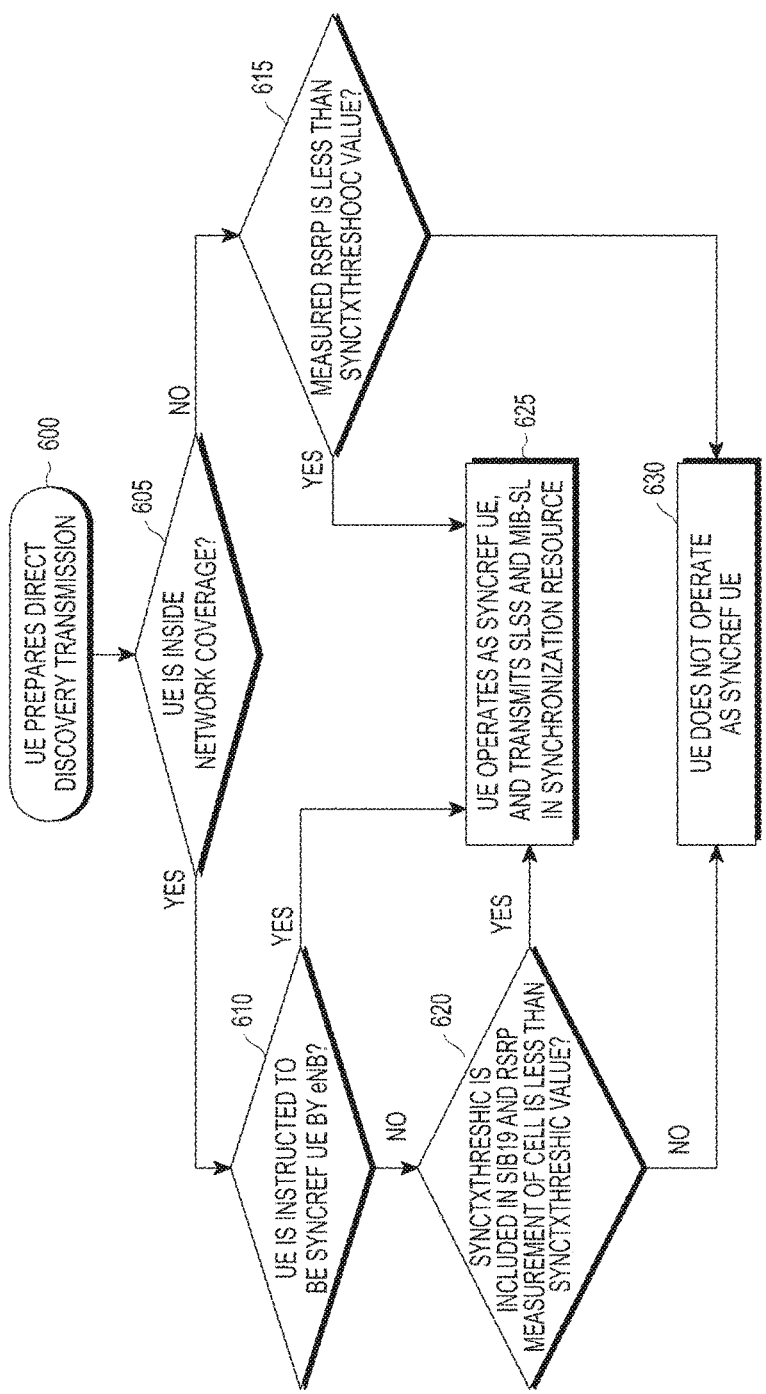
FIG. 6 is a flowchart illustrating a SyncRef UE initialization procedure of a UE that performs a discovery according to the present disclosure.

FIG. 6 is a flowchart illustrating a SyncRef UE initialization procedure of a UE that performs discovery according to the present disclosure.

A UE prepares direct discovery transmission (operation 600).

The UE checks whether the UE is inside network coverage (operation 605).

As a result of the checking (operation 605), when the UE is inside the coverage of a cell, the UE checks whether the UE has been instructed to operate as a SyncRef UE by an eNB (operation 610).

As a result of the checking (operation 610), when the UE has been instructed to operate as the SyncRef UE, the UE transmits an SLSS and an MIB-SL in a synchronization resource while operating as the SyncRef UE (operation 625). As a result of the checking (operation 610), when the UE has not been instructed to operate as the SyncRef UE, the UE checks whether syncTxThreshIC is included in SIB19 and the RSRP measurement result of the cell is less than the syncTxThreshIC (operation 620).

As a result of the checking (operation 620), the RSRP measurement result of the cell is not less than the syncTxThreshIC, the UE does not operate as the SyncRef UE (operation 630).

As a result of the checking (operation 605), when the UE is not inside the coverage of the cell, the UE checks whether the RSRP measurement results of all discovered SLSSs are less than syncTxThreshOoC (operation 615).

As a result of the checking (operation 615), when the RSRP measurement results of all discovered SLSSs are less than the syncTxThreshOoC, the UE may transmit an SLSS and an MIB-SL in a synchronization resource while operating as the SyncRef UE (operation 625). As a result of the checking (operation 615), when the RSRP measurement results of all discovered SLSSs are not less than the syncTxThreshOoC, it may be determined that the UE does not operate as the SyncRef UE (operation 630).

As described above, when syncTxThreshOoC included in ProsePreconfiguration is commonly configured with respect to sidelink communication and discovery, the parameter syncTxThreshOoC may be directly used for the discovery.

Alternatively, the syncTxThreshOoC may be differently configured with respect to the sidelink communication and the discovery. In this case, syncTxThreshOoC specific to the discovery will be used for an out-of-coverage discovery UE.

2) SLSS Transmission

For sidelink transmission, there are two sets of SLSSs, i.e., SLSS_net including identifiers (or identities) {0, 1, ... , 167} and SLSS_oon including identifiers {168, 169, ... , 335}.

An SLSS transmitted by an in-coverage UE is within the SLSS_net and indicated by an eNB, and an SLSS transmitted by an out-of-coverage UE is selected from the SLSS_oon.

When an SLSS is discovered from the SLSS_net, the out-of-coverage UE may transmit the discovered SLSS, provided that a pre-defined reference is satisfied.

The UE may select an SLSS and a synchronization resource unit subframe as in Table 4.

TABLE 4

When a cell used in the transmission of ProSe direct discovery announcement is proper, or the cell used in ProSe direct discovery transmission satisfies S-criteria (as defined in 3GPP TS 36.304) and conditions for supporting ProSe direct discovery in a limited service state (as defined in 3GPP 23.303):
    Select an SLSSID included in discSynConfig which is an entry included in a received SIB19;
    Select a subframe in which the SLSS is transmitted according to sync-OffsetIndicator included in the entry discSynConfig used in selecting the SLSS;
    Otherwise (i.e. out-of-coverage)
        When a UE has a selected SynRef UE, and inCoverage in an MIB-SL received from the SynRef UE is configured as TRUE:
            Select the same SLSSID as an SLSSID of the selected SynRef UE;
            Select a subframe in which the SLSS is to be transmitted according to sync-OffsetIndicator1 or sync-OffsetIndicator2 included in pre-configured ProSe parameters, so that subframe timing is different from an SLSS of the selected SynRef UE;
        However, when the UE has a selected SynRef UE, inCoverage in an MIB-SL received from the SynRef UE is configured as FALSE, and an SLSS from the SynRef UE is one subset of a set of SLSSs, defined for an in-coveage case:
            Select an SLSSID, which has an index larger by 168 than an index of SLSSIDs of the selected SynRef UE, from a set which is defined for an out-of-coverage case;
            Select a subframe in which the SLSS is to be transmitted according to sync-OffsetIndicator1 or sync-OffsetIndicator2 included in pre-configured ProSe parameters, so that subframe timing is different from an SLSS of the selected SynRef UE;

TABLE 4-continued

Figure 7:
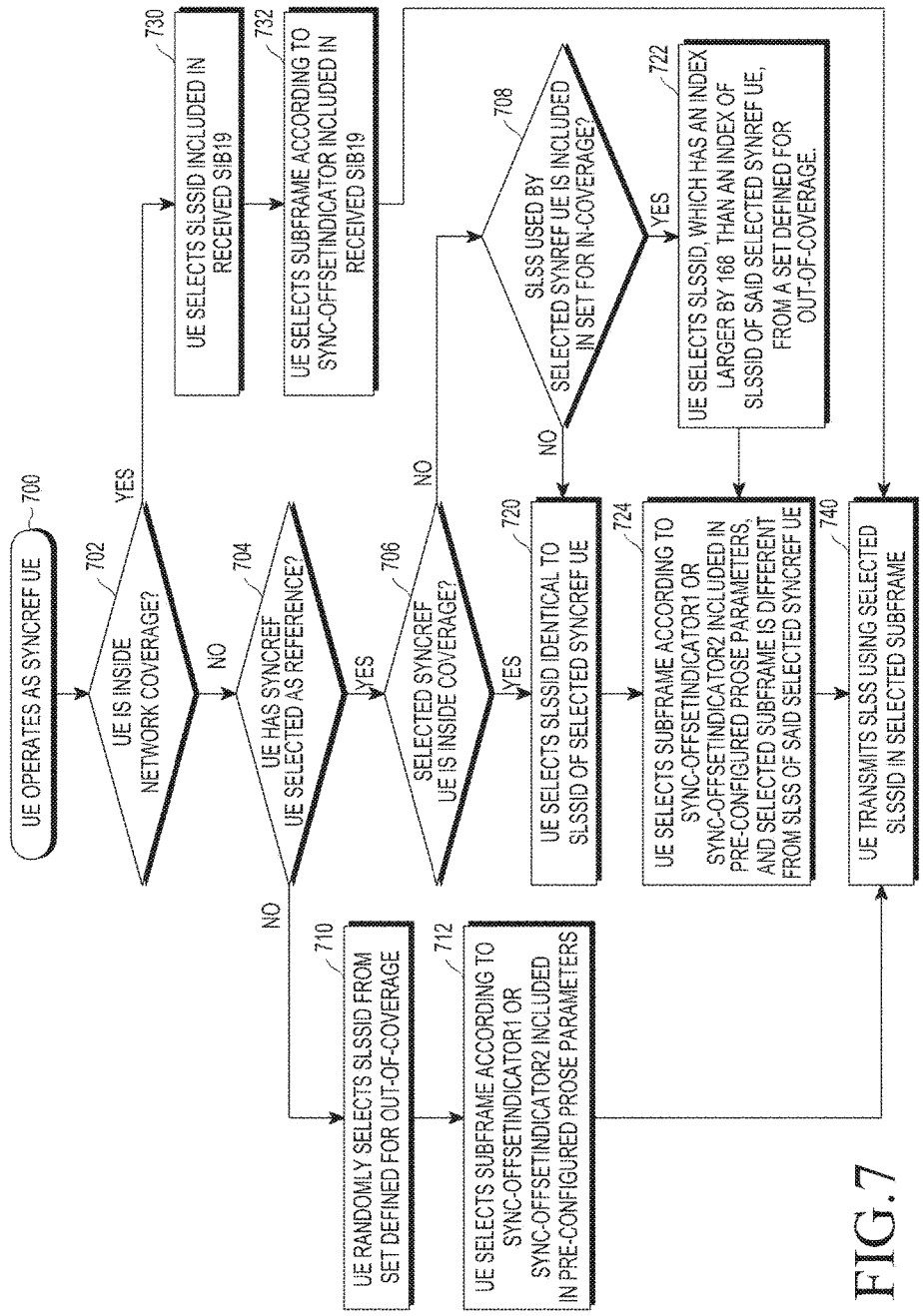
FIG. 7 is a flowchart illustrating a procedure for SLSS selection and synchronization subframe selection.

However, if the UE has a selected SynRef UE, inCoverage in an MIB-SL received from the SynRef UE is configured as FALSE, and an SLSS from the SynRef UE is one subset of a set of SLSSs, defined for an out-of-coverage case:
    Select the same SLSSID as an SLSSID of the selected SynRef UE;
    Select a subframe in which the SLSS is to be transmitted according to sync-OffsetIndicator1 or sync-OffsetIndicator2 included in pre-configured ProSe parameters, so that subframe timing is different from an SLSS of the selected SynRef UE;
    Otherwise (i.e. not select SynRef UE)
        Randomly select an SLSSID from a set of sequences defined for an out-of-coverage case
        Select a subframe in which the SLSS is to be transmitted according to sync-OffsetIndicator1 or sync-OffsetIndicator2 included in pre-configured ProSe parameters;

FIG. 7 is a flowchart illustrating a procedure for SLSSID selection and synchronization subframe selection.

A UE operates as a SyncRef UE (operation 700).

The UE checks whether the UE is inside network coverage (operation 702).

As a result of the checking (operation 702), when the UE is inside the coverage, the UE selects an SLSSID included in a received SIB19 as an ID of an SLSS to be transmitted (operation 730). Further, the UE may select a subframe according to sync-OffsetIndicator included in the SIB19 (operation 732). The UE transmits an SLSS by using the selected SLSSID in the selected subframe (operation 740).

As a result of the checking (operation 702), when the UE is not inside the coverage, the UE checks whether there is a SyncRef UE which the UE has selected as a synchronization reference (operation 704).

As a result of the checking (operation 704), when there is a SyncRef UE selected as the synchronization reference, the UE checks whether the selected SyncRef UE is inside the coverage (operation 706).

As a result of the checking (operation 706), when the selected SyncRef UE is inside the coverage (e.g. when inCoverage within an MIB-SL received from the SyncRef UE is TRUE), the UE selects the same SLSSID as an SLSSID of the selected SyncRef UE (operation 720). Further, the UE selects a subframe according to sync-OffsetIndicator1 or sync-OffsetIndicator2 included in pre-configured ProSe parameters (operation 724). Therefore, in this case, the subframe, which has been selected by the UE, becomes different from an SLSS of the selected SyncRef UE. The UE transmits an SLSS by using the selected SLSSID in the selected subframe (operation 740).

As a result of the checking (operation 706), when the selected SyncRef UE is not inside the coverage (e.g. when inCoverage within an MIB-SL received from the SyncRef UE is FALSE), the UE checks whether an SLSSID used by the selected SyncRef UE is included in an SLSSID set for an in-coverage case (operation 708).

As a result of the checking (operation 708), when the SLSSID used by the selected SyncRef UE is not included in the SLSSID set for the in-coverage case, the UE selects the same SLSSID as an SLSSID of the selected SyncRef UE (operation 720). Further, the UE may select a subframe through operation 724 and transmit an SLSS as in operation 740.

As a result of the checking (operation 708), when the SLSSID used by the selected SyncRef UE is included in the SLSSID set for the in-coverage case, the UE selects an SLSSID, which has an index larger by 168 than an index of an SLSSID of the selected SyncRef UE, from a set defined for an out-of-coverage case (operation 722). Further, the UE may select a subframe through operation 724 and transmit an SLSS as in operation 740.

Meanwhile, as a result of the checking (operation 704), when there is no SyncRef UE which the UE has selected, the UE randomly selects an SLSSID from an SLSSID set defined for the out-of-coverage case (operation 710). Further, the UE selects a subframe according to sync-OffsetIndicator1 or sync-OffsetIndicator2 included in pre-configured ProSe parameters (operation 712). The UE transmits an SLSS by using the selected SLSSID in the selected subframe (operation 740).

Figure 8:
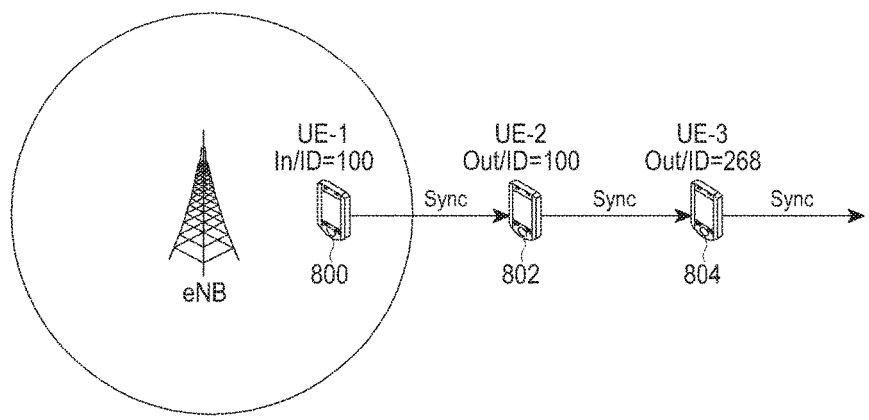
FIG. 8 illustrates the selection of an SLSSID in a partial coverage scenario according to the present disclosure.

FIG. 8 illustrates the selection of an SLSSID in a partial coverage scenario according to the present disclosure.

An in-coverage UE-1 800 may transmit an SLSS, a SLSSID value of which is 100.

An out-of-coverage UE-2 802 has the in-coverage UE-1 800 as a SyncRef UE, and may select, as a SLSSID, the same value as that of an SLSSID of the UE-1 800 and transmit an SLSS.

An out-of-coverage UE-3 804 has the out-of-coverage UE-2 802 as a SyncRef UE, and, since an SLSSID of the UE-2 802 is included in an SLSSID set for an in-coverage case, the UE-3 804 may select, as an SLSSID, 268 which is larger by 168 than the SLSSID of the UE-2 802, and transmit an SLSS.

Figure 9:
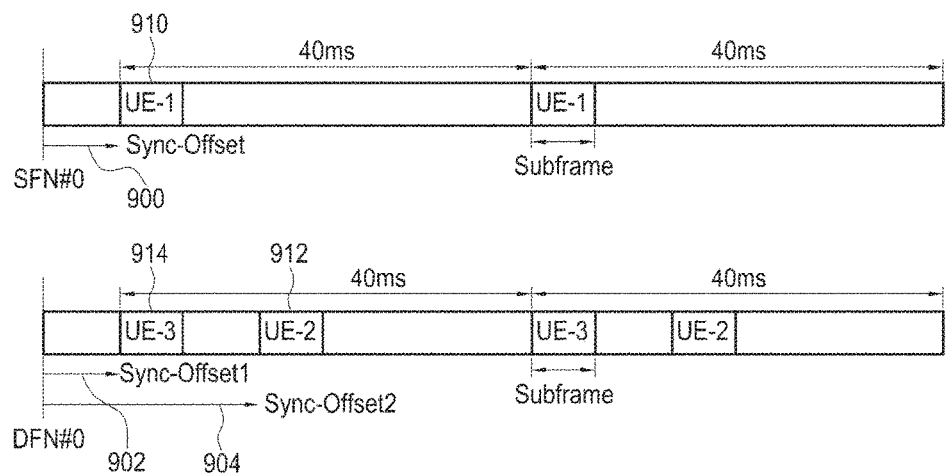
FIG. 9 illustrates the selection of a synchronization subframe in a partial coverage scenario according to the present disclosure.

FIG. 9 illustrates the selection of a synchronization subframe in a partial coverage scenario according to the present disclosure.

sync-OffsetIndicator1 900 or 902 and sync-OffsetIndicator2 904 included in ProsePreconfiguration is offset information which specifies the location of a synchronization subframe from a direct SubFrame Number (SFN) or a Direct Frame Number (DFN) Subframes 910, 912, and 914 indicate subframes which can be used by the UE-1 800, the UE-2 802, and the UE-3 804, respectively.

As described above, when the sync-OffsetIndicator1 900 or 902 and sync-OffsetIndicator2 904, which are parameters included in the ProsePreconfiguration, is commonly configured with respect to sidelink communication and discovery, the parameters may be directly used for discovery of the in-coverage UE-1 800 or the out-of-coverage UE-2 802 and the out-of-coverage UE-3 804. However, sync-OffsetIndicator1 and sync-OffsetIndicator2 specific to discovery may be configured, and parameters specific to the discovery may be used for the out-of-coverage discovery UE-2 802 and UE-3 804.

3) MIB-SL Transmission

MIB-SL transmission by a SyncRef UE may include timing information and at least one of the additional configuration parameters exemplified in Table 5.

TABLE 5

Sidelink bandwidth (si-Bandwidth)
Configure TDD (tdd-SubframeAssignment)
    FDD or TDD, together with configuration index
Sidelink transmission timing information
    directFrameNumber (10 bits)
    directSubframeNumber (4 bits)
Indicate coverage (inCoverage)
    Indicate whether SynRef UE is in coverage or out of coverage
Reserved synchronization information (sync-InfoReserved)
    Configured by network A UE may configure contents of an MIB-SL message according to conditions exemplified in Table 6.

TABLE 6

When a cell used in the transmission of ProSe direct discovery
announcement (as defined in 3GPP TS 36.304) is proper, or the cell used
in ProSe direct discovery transmission satisfies S-criteria (defined in
3GPP TS 36.304) and conditions for supporting ProSe direct discovery in
a limited service state (as defined in 3GPP 23.303):
    Configure inCoveage as TRUE;
    Configure sl-Bandwidth by a ul-Bandwidth value included in a
received SIB2 of a cell used for ProSe direct discovery
    When tdd-Config is included in a received SIB1:
        Configure a value of tdd-SubframeAssignment by a value
indicating the same meaning as that of tdd-SubframeAssingment included
in tdd-Config within the received SIB1
    Otherwise:
        Configure the value of tdd-SubframeAssingment as none;
    When sync-InfoReserved is included in discSyncConfig which is
an entry of the received SIB19:
        Configure the value of sync-InfoReserved by a value of
sync-InfoReserved within the received SIB19;
    Otherwise:
        Configure all bits of sync-InfoReserved as zero
    Otherwise (i.e. out-of-coverage)
    When a UE has a selected SynRef UE:
        Configure a value of inCoverage as FALSE;
        Configure values of sl-Bandwidth,
tdd-SubframeAssignment, and reserved by corresponding field values
included in the received MIB-SL
    Otherwise:
        Configure a value of inCoverage as FALSE;
        Configure values of sl-Bandwidth,
tdd-SubframeAssignment, and reserved by corresponding field values
included in pre-configured ProSe parameters;
    Configure directFrameNumber and directSubfrmaeNumber by a value
corresponding to subframe used for SLSS transmission;
    When the above procedure ends, submit an MIB-SL message to a
    lower layer for transmission;

It should be noted that DMRSs for sidelink communication and discovery may be different. The DMRSs different according to the sidelink communication and the discovery allows an out-of-coverage UE to easily know whether an MIB-SL has been transmitted from a discovery UE or has been transmitted from a sidelink communication UE.

4) SyncRef UE Selection

A procedure exemplified in Table 7 may be applied to the SyncRef UE selection of a UE.

TABLE 7

When there is no cell, which satisfies S-criteria (as defined
in 3GPP TS 36.304), among frequencies used for ProSe direct discovery:
    Carry out full search (i.e. search for all subframes and
all available SLSS IDs) for discovering an SLSS
    When an L3-filtered (e.g. filtering using a coefficient
in a Radio Resource Control (RRC) layer) RSRP measurement result is
equal to or higher than syncTxThreshOoC included in pre-configured
ProSe parameters and a UE receives multiple SLSSs corresponding to
a MIB-SL message (received from a candidate SynRef UE), the UE
selects a SynRef UE according to the following priorities:
        1) UEs having inCoverage which is included in the
received MIB-SL and is configured as TRUE, start from a UE having
the highest RSRP result
        2) UEs having an SLSS which is one subset of an SLSS
set defined for an in-coverage case, start from a UE having the highest
RSRP result
        3) other UEs, start from a UE having the highest RSRP
        result C. Discovery Method 1) Discovery Between Out-of-Coverage UEs When there is no signal which is discovered from an in-coverage UE, out-of-network coverage UEs may discover each other in a pre-configured resource pool.

2) Discovery Between Out-of-Coverage UE and in-Coverage UE

When an out-of-coverage UE discovers a signal from an in-coverage UE, it is desirable that the out-of-coverage UE and the in-coverage UE discover each other. However, when there is a mismatch between a pre-configuration for an out-of-coverage case and a configuration for an in-coverage case, there will be problems in discovering the in-coverage UE by the out-of-coverage UE and vice versa.

First, when there is a mismatch between resource pool configurations (e.g. a subframe bitmap within a resource pool or an index of RB used within a resource pool), UEs have difficulty in discovering each other.

Figure 10A:
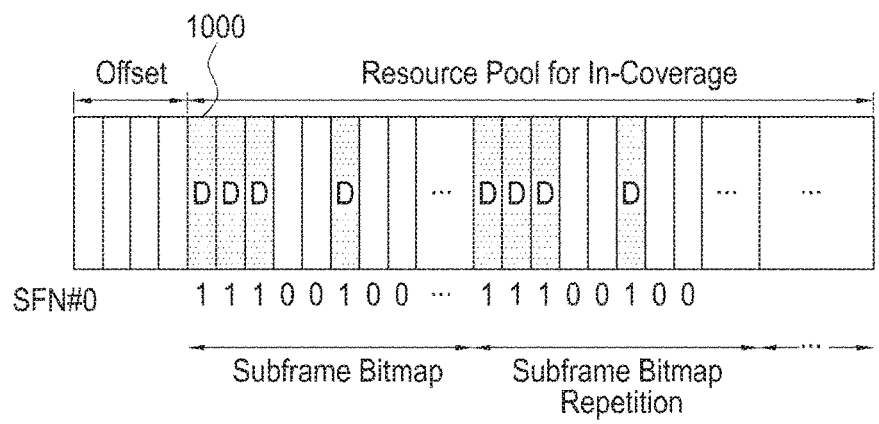
FIG. 10A illustrates a subframe bitmap of an in-coverage resource pool.
Figure 10B:
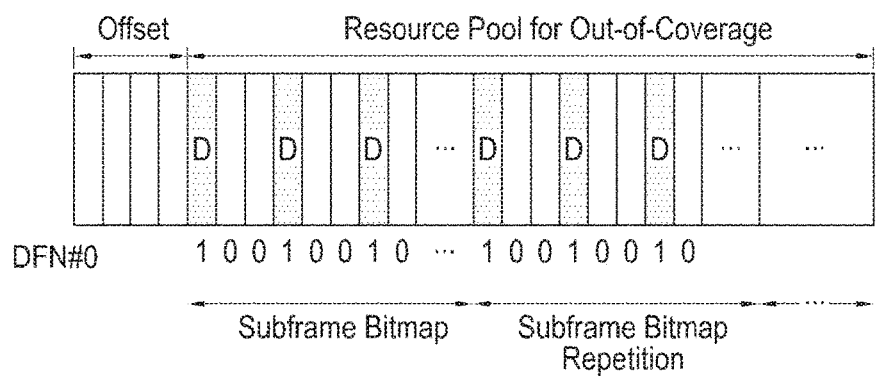
FIG. 10B illustrates a subframe bitmap of an out-of-coverage resource pool.

FIGS. 10A and 10B illustrate examples of a subframe bitmap mismatch between an in-coverage resource pool and an out-of-coverage resource pool.

FIG. 10A illustrate an in-coverage resource pool, and FIG. 10B illustrates an out-of-coverage resource pool. Referring to FIGS. 10A and 10B, it can be understood that the arrangement of subframes indicated by "1" (i.e. subframes 1000 indicated by "D" in FIG. 10) is different between the in-coverage resource pool (FIG. 10A) and the out-of-coverage resource pool (FIG. 10B). In other words, subframe bitmaps are different between an in-coverage configuration and an out-of-coverage configuration, thereby causing a subframe mismatch in the entire resource pool. The subframe bitmap may be configured by "1" which means that an allocation is made for a discovery and "0" which means that an allocation is not made.

In addition, an RB configuration within a frequency domain may also be different between the in-coverage resource pool and the out-of-coverage resource pool. Therefore, even when the timing of the out-of-coverage UE is synchronized with the in-coverage (i.e. cell network), discovery failure due to a mismatch between resources (i.e. subframes or RBs) may occur.

Second, a mismatch between configurations of transmission parameters for the out-of-coverage case and the in-coverage case may also cause a problem when UEs discover each other.

For example, the number of times of discovery message repetition is configured by an eNB in the in-coverage case and is pre-configured in the out-of-coverage case. The number of times of repetition influences a resource used to transmit one discovery message.

Figure 11A:
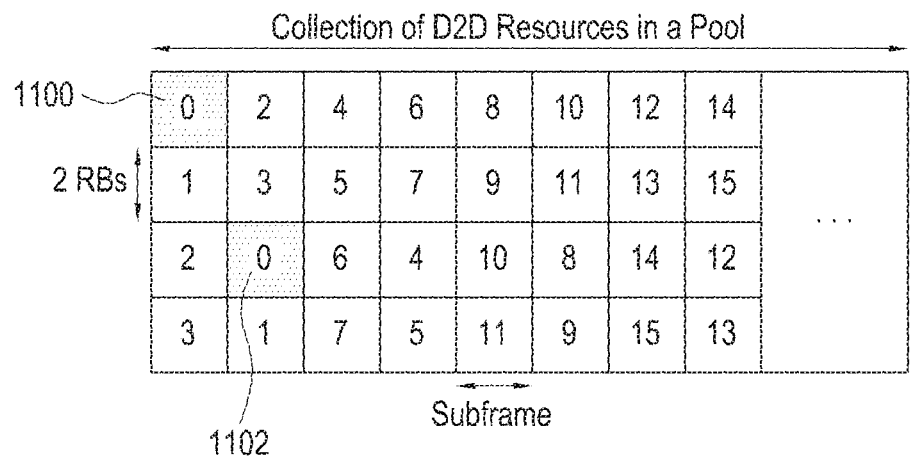
FIG. 11A illustrates a resource in the case of repeating discovery transmission two times in the present disclosure.
Figure 11B:
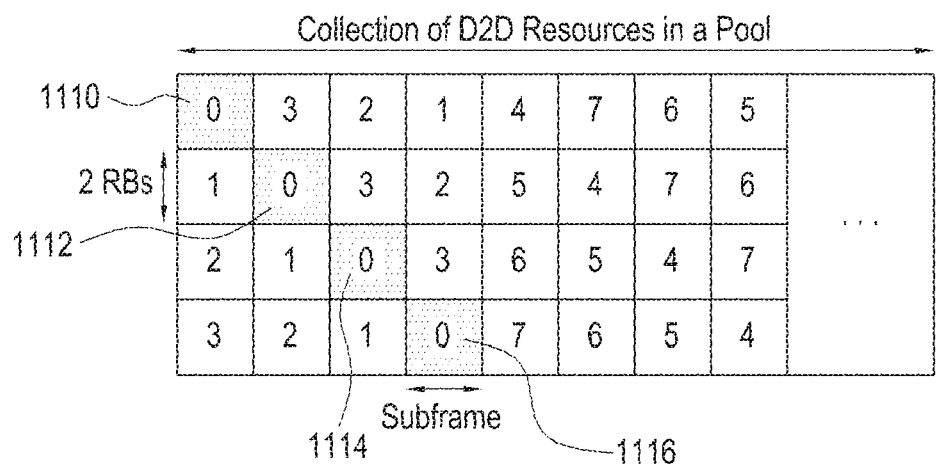
FIG. 11B illustrates a resource in the case of repeating discovery transmission four times in the present disclosure.

FIGS. 11A and 11B illustrates examples of resources in the case of performing discovery transmission by the different number of times of repetition (two or four) in the present disclosure.

FIG. 11A illustrates a resource pool in the case of repeating discovery transmission two times and FIG. 11B illustrates a resource pool in the case of repeating discovery transmission four times.

In FIGS. 11A and 11B, unit discovery resources indicated by an identical index indicate identical discovery message resources. One discovery message occupies one subframe in a time domain and occupies two RBs in a frequency domain. In FIG. 11, for the convenience of understanding, 1 subframe*2 RBs has been expressed as one unit resource (i.e. unit tetragon).

One discovery message, repetition of which is made n times, is transmitted in n adjacent subframe(s), and frequency hopping may also be different with respect to the different numbers of times of repetition. For example, unit resources 1100 and 1102, which are expressed as "0" in FIG. 11A, indicate resources used in repeating the transmission of one discovery message two times, respectively. Further, unit resources 1110, 1112, 1114, and 1116, which are expressed as "0" in FIG. 11B, indicate resources used in repeating the transmission of one discovery message four times, respectively. Therefore, even though in the same resource pool, the different numbers of times of repetition may cause a problem in receiving a discovery message.

An operation of the out-of-coverage UE may vary depending on a method for configuring an in-coverage resource pool by an eNB. Hereinafter, solutions which enable discovery between an in-coverage UE and an out-of-coverage UE will be proposed, and an operation of the corresponding UE will be described. It is assumed that the out-of-coverage UE and the in-coverage UE have discovered synchronization signals from each other and have been synchronized with each other. The in-coverage UE and the out-of-coverage desire to discover each other.

A first solution is to perform a configuration for an in-coverage case without considering a pre-configuration for out-of-coverage by an eNB.

The first solution is motivated by the desire to provide full flexibility to the eNB in configuring an in-coverage resource pool and parameters related thereto. For an out-of-coverage scenario does not frequently occur. The in-coverage resource pool configured by the eNB may or may not overlap a pre-configured resource pool for an out-of-coverage case. In this case, the out-of-coverage UE may discover the in-coverage UE, or, conversely, the in-coverage UE may not discover the out-of-coverage UE.

In this case, the out-of-coverage UE may be required to perform a blind discovery with respect to all discovery messages. It may not be possible for the out-of-coverage UE to combine repeated transmission of the same discovery message, because the out-of-coverage UE has no information related to configuration of an accurate resource pool and a corresponding transmission parameter for an in-coverage case. Similarly, the in-coverage UE may also attempt a blind discovery with respect to discovery messages from the out-of-coverage UE.

A second solution is to perform, by an eNB, a configuration for an in-coverage case in consideration of a pre-configuration for an out-of-coverage case.

The second solution is motivated by the desire to assign priority to considering an out-of-coverage scenario support because an out-of-coverage discovery is very important for some cases, such as public safety. There may be several options in a configuration for an in-coverage operation.

Option 1) an eNB performs a configuration for an in-coverage resource pool and transmission parameter, which is identical to a pre-configuration for an out-of-coverage operation.

Option 2) An eNB configures a subset of a pre-configured resource pool for an out-of-coverage case with respect to an in-coverage operation. For example, as illustrated in FIG. 12, a subframe bitmap identical to that of a pre-configuration for an out-of-coverage operation may be used in an in-coverage case, but a smaller number of times of bitmap reception may be used in the in-coverage case.

Figure 12A:
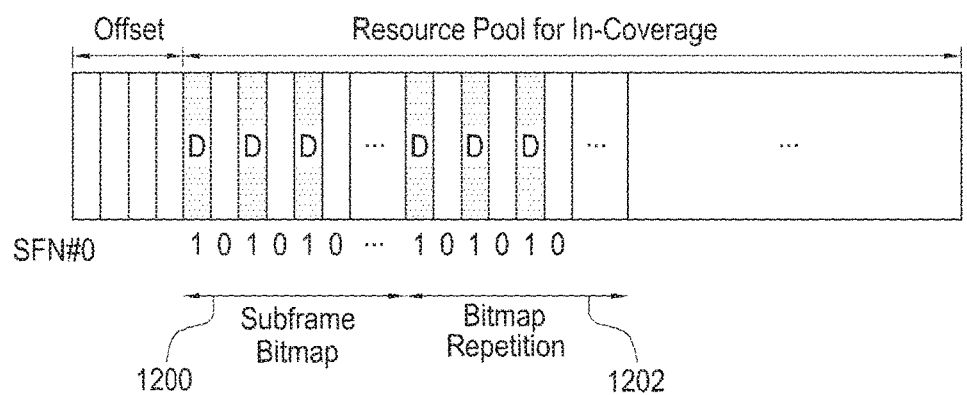
FIG. 12A illustrates a resource pool for an in-coverage case required when an in-coverage UE and an out-of-coverage UE discover each other according to the present disclosure.
Figure 12B:
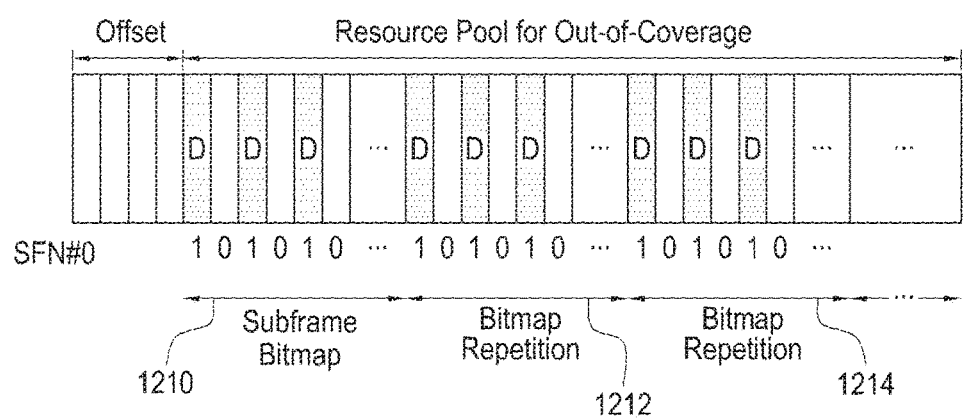
FIG. 12B illustrates a resource pool for an out-of-coverage case required when an in-coverage UE and an out-of-coverage UE discover each other according to the present disclosure.

FIGS. 12A and 12B illustrate a resource when a subset of a pre-configured resource for out-of-coverage is configured with respect to an in-coverage operation according to the present disclosure.

FIG. 12A illustrates a resource pool for an in-coverage case, and FIG. 12B illustrates a resource pool for an out-of-coverage case. For the out-of-coverage case, three or more subframe bitmaps 1210, 1212, and 1214 are used. However, for the in-coverage case, only two subframe bitmaps 1200 and 1202 are used. In other words, a subset of a resource pool for out-of-coverage is used for an in-coverage operation.

In option 1, the resource pool for an in-coverage case, which is configured by the eNB, is accurately identical to the resource pool for an out-of-coverage case. When an identical transmission parameter is configured, an in-coverage UE and an out-of-coverage UE can discover each other without any problem.

In option 2, when an identical transmission parameter is configured, the in-coverage UE and the out-of-coverage UE may discover each other for at least a period of time of an in-coverage resource pool.

Compared with option 1, option 2 has more flexibility because an eNB can configure a period of time of a resource pool for an in-coverage case (i.e. the number of times of applied bitmap) in consideration of the traffic load state of the in-coverage UE. When a resource required for the in-coverage UE has a much smaller size than that of a pre-configured resource pool for an out-of-coverage case, option 1 may cause the wasteful use of resources. Therefore, in this case, option 2 may be a more efficient approach method.

A third solution is to perform, by an eNB, a configuration for an in-coverage case on the basis of a UE report.

A motive of the third solution is to perform a configuration event-triggered as needed.

For example, when an in-coverage UE discovers a signal (e.g. SLSS) of an out-of-coverage UE, the in-coverage UE may report the discovered signal to the eNB. After receiving the report from the in-coverage UE, the eNB may know that the UE is outside network coverage. When the current configuration for the in-coverage case does not match an out-of-coverage pre-configuration, the eNB may reconfigure the in-coverage resource pool. In other words, when the report relating to the out-of-coverage signal discovery is not received, the eNB may perform a configuration for an in-coverage case by the first solution. Further, when the report relating to the out-of-coverage signal discovery is received, the eNB may reconfigure the in-coverage resource pool on the basis of the second solution.

Figure 13:
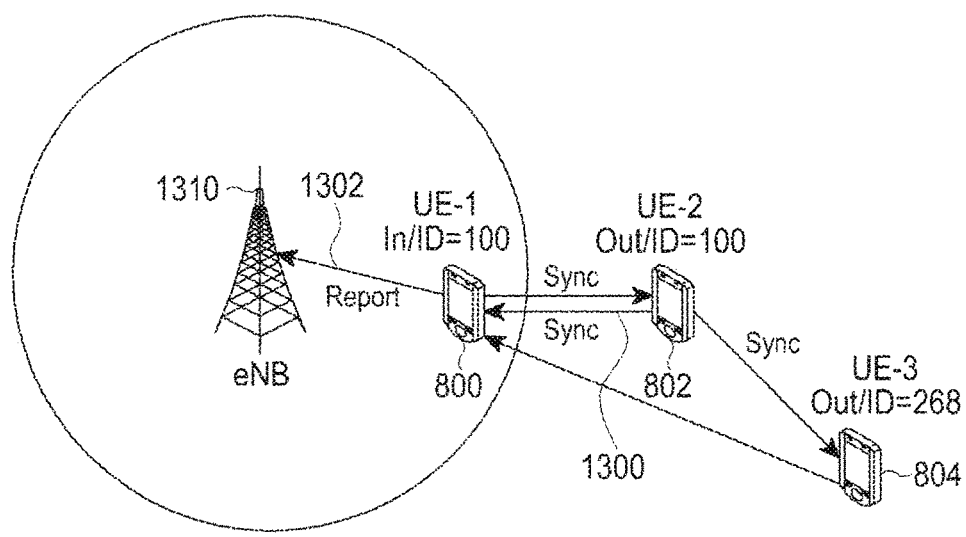
FIG. 13 illustrates a scenario of an out-of-coverage signal discovery report by an in-coverage UE according to the present disclosure.

FIG. 13 illustrates a scenario of an out-of-coverage signal discovery report by an in-coverage UE according to the present disclosure.

In relation to FIG. 13, for example, the UE-1 800 can discover an SLSS 1300 from the UE-2 802 because the UE-1 800 and the UE-2 802 transmit, as illustrated in FIG. 9, an SLSS in different synchronization subframes 910 and 912, respectively and thus a collision between transmission resources does not occur. The UE 1 800 may report discovery of an out-of-coverage SLSS to an eNB 1310 (operation 1302). The eNB 1310, which has received the report (operation 1302), may check whether a configuration for an in-coverage case is performed again when the report does not match a pre-configuration for an out-of-coverage case. After the in-coverage re-configuration, the in-coverage UE 800 and the out-of-coverage UE (e.g. UE-3 804) may successfully discover each other.

An example of a procedure corresponding to the third solution will be described in FIG. 14.

Figure 14:
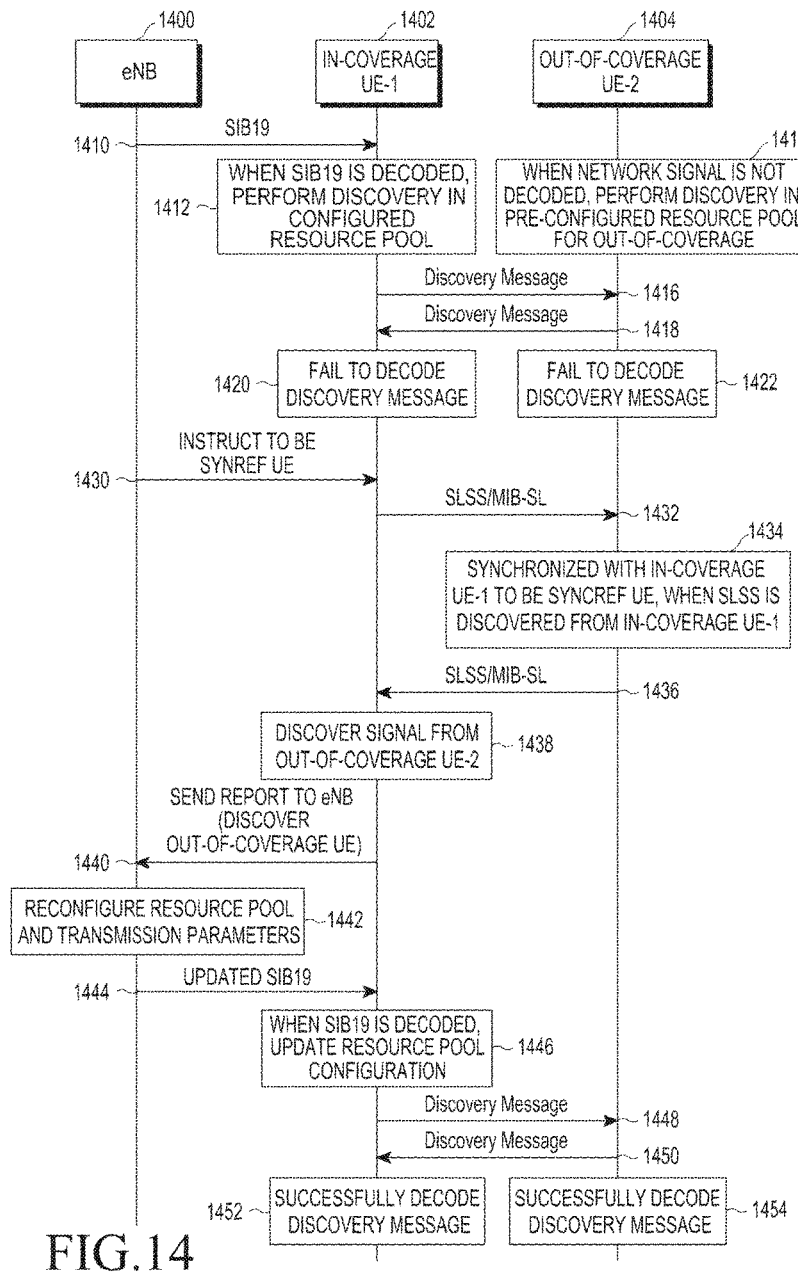
FIG. 14 illustrates a discovery procedure between an in-coverage UE and an out-of-coverage UE, based on an out-of-coverage signal discovery report by the in-coverage UE, in the present disclosure.

FIG. 14 illustrates a discovery procedure between an in-coverage UE and an out-of-coverage UE, based on an out-of-coverage signal discovery report by the in-coverage UE according to the present disclosure.

An eNB 1400 transmits an SIB19 to an in-coverage UE-1 1402 (operation 1410).

The in-coverage UE-1 1402 receives the SIB19, and performs, when the SIB19 is decoded, a discovery in a resource pool configured by the eNB 1400 (operation 1412). An out-of-coverage UE-2 1404 does not receive a signal (e.g. SIB19) from a network (i.e. eNB) or does not decode the signal. Therefore, the UE-2 1404 may perform a discovery in a pre-configured resource pool for an out-of-coverage case (operation 1414). For example, the UE-1 1402 may transmit a discovery message in the resource pool configured by the eNB (operation 1416), and the UE-2 1404 may transmit a discovery message in the pre-configured resource pool (operation 1418). In this case, due to a mismatch between the in-coverage resource pool and the out-of-coverage resource pool, the UE-1 1402 may not decode a discovery message of the UE-2 1404 (operation 1420). Conversely, the UE-2 1404 may also fail to decode a discovery message of the UE-1 1402 (operation 1422).

The eNB 1400 may instruct the UE-1 1402 to become a SynRef UE (operation 1430).

The UE-1 1402, which has become the SynRef UE, may transmit SLSS and an MTB-SL (operation 1432).

The UE-2 1404, which has discovered the SLSS from the UE-1 1402, may be synchronized with the UE-1 1402 and then operate as the SynRef UE (operation 1434).

The UE-2 1404, which operates as the SynRef UE, may transmit an SLSS and an MIB-SL (operation 1436).

The UE-1 1402 may discover a SLSS signal from the UE-2 1404 (operation 1438), and report discovering of a signal from an out-of-coverage UE (i.e. the UE-4) to the eNB 1400 (operation 1440).

The eNB 1400, which has received the reporting (operation 1440) from the UE-1 1402, may reconfigure the resource pool for an in-coverage case and transmission parameters (operation 1442), and may update and transmit the SIB19 (operation 1444).

The UE-1 1402, which has received the updated SIB19, may decode the SIB19, and update a resource pool configuration as indicated by the SIB19 (operation 1446). The UE-1 1402 may transmit a discovery message in the updated resource pool (operation 1448). The UE-2 1404 may also transmit a discovery message in the out-of-coverage resource pool (operation 1450). The UE-1 1402, which performs discovery in the reconfigured resource pool, may successfully decode a discovery message of the UE-2 1404 (operation 1452). The UE-2 1404 may also successfully decode a discovery message of the UE-1 1402 (operation 1454).

Figure 15:
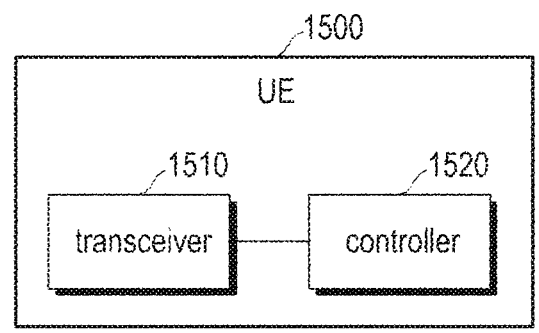
FIG. 15 illustrates a configuration of a UE device according to the present disclosure.

FIG. 15 illustrates a configuration of a UE device according to the present disclosure.

A UE device 1500 may include: a transceiver 1510 that can transmit or receive a signal to or from an eNB or another UE; and a controller 1520 that controls the transceiver 1510. It goes without saying that the transceiver 1510 and the controller 1520 may be implemented by one device.

The controller 1520 is an element that implements a discovery method of a UE described in the present disclosure. In other words, it may be understood that the above-described all operations of the UE are performed by the controller 1520.

Figure 16:
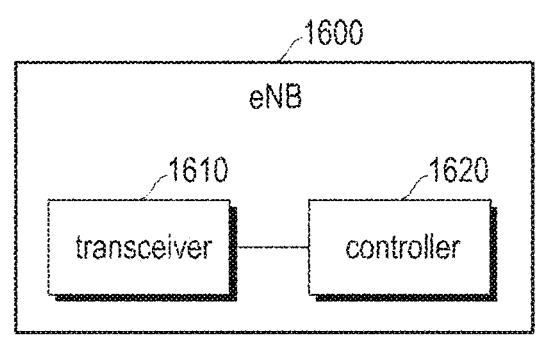
FIG. 16 illustrates a configuration of an eNB device according to the present disclosure.

FIG. 16 illustrates a configuration of an eNB device according to the present disclosure.

An eNB device 1600 may include: a transceiver 1610 that can transmit/receive a signal to/from a UE; and a controller 1620 that controls the transceiver 1610. It goes without saying that the transceiver 1610 and the controller 1620 may be implemented by one device.

The controller 1620 is an element that implements a discovery support method performed in an eNB which has been described in the present disclosure. In other words, it may be understood that the above-described all operations of the eNB are performed by the controller 1620.

It should be noted that a description of procedures exemplified. Tables 1 to 7, and a view illustrating a system configuration, a view illustrating an example of a configuration of a resource pool, a view illustrating an example of a method, etc as in FIGS. 3 to 16 are not intended to limit the scope of the present disclosure. In other words, it should not be construed that all descriptions, resource pool arrangement, constituent elements, or steps of operation, shown Tables 1 to 7 and FIGS. 3 to 16, are essential elements for implementing the present disclosure. Only some elements may implement the present disclosure within a scope in which the subject matter of the present disclosure is not damaged.

The above described operations may be implemented by providing a memory device storing a corresponding program code to the entity of the communication system, the function, the base station, or a specific element of the UE. That is, the entity, the function, or the controller of the UE carries out the above described operations by reading and executing the program code stored in the memory device by means of a processor or a CPU.

The entity, the function, the base station, various elements of the UE, modules and the like may be operated by using a hardware circuit, e.g. a complementary metal oxide semiconductor based logic circuit, firmware, software, and/or a combination of hardware and the firmware and/or software embedded in a machine readable medium. As an example, various electric configurations and methods may be carried out by using electric circuits such as transistors, logic gates, and an application specific integrated circuit (ASIC).

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

The invention claimed is:

1. A method of a user equipment (UE) in a wireless communication network, the method comprising:
 identifying pre-configuration information for a transmission of a synchronization signal; and
 transmitting the synchronization signal in a transmission resource determined based on the pre-configuration information,
 wherein the pre-configuration information comprises a pool list for device to device (D2D) communication, and
 wherein the UE exists outside of coverage in which a service is provided by a base station.

2. The method of claim 1, further comprising:
 discovering a signal from another UE; and
 determining whether a received signal received power (RSRP) of the discovered signal is less than a threshold value,
 wherein the threshold value is included in the pre-configuration information.

3. The method of claim 2,
 wherein the synchronization signal is transmitted when the RSRP is less than the threshold value, and
 wherein system information is transmitted along with the synchronization signal for the D2D communication in the transmission resource determined based on the pre-configuration information.

4. The method of claim 1, wherein the pre-configuration information further comprises at least one of a number of times of retransmission of the synchronization signal, a number of subframe bitmaps during one discovery period, or information indicating a discovery offset.

5. The method of claim 1, further comprising:
receiving, from another UE, system information or a synchronization signal for the D2D communication in a reception resource determined based on another pool list included in the pre-configuration information.

6. The method of claim 5, further comprising:
determining whether a received signal received power (RSRP) of the received synchronization signal is less than a threshold value included in the pre-configuration information; and
transmitting, when the RSRP is less than the threshold value, at least one of the system information or the synchronization signal for D2D communication in the transmission resource determined based on the pre-configuration information,
wherein an identifier (ID) of the transmitted synchronization signal is determined based on the received system information.

7. The method of claim 6, wherein the received system information comprises information indicating whether the adjacent UE is inside the coverage, and, when the adjacent UE is inside the coverage, the ID of the transmitted synchronization signal is determined to be identical to an ID of the received synchronization signal.

8. A user equipment (UE) in a wireless communication network, the UE comprising:
at least one processor configured to control to:
identify pre-configuration information for a transmission of a synchronization signal, and
transmit the synchronization signal in a transmission resource determined based on the pre-configuration information; and
a transceiver configured to transmit the synchronization signal, by a control of the at least one processor,
wherein the pre-configuration information comprises a pool list for device to device (D2D) communication, and
wherein the UE exists outside of coverage in which a service is provided by a base station.

9. The UE of claim 8,
wherein the at least one processor is further configured to:
discover a signal from another UE, and
determine whether a received signal received power (RSRP) of the discovered signal is less than a threshold value, and
wherein the threshold value is included in the pre-configuration information.

10. The UE of claim 9,
wherein the synchronization signal is transmitted, when the RSRP is less than the threshold value, and
wherein system information is transmitted along with the synchronization signal for the D2D communication in the transmission resource determined based on the pre-configuration information.

11. The UE of claim 8, wherein the pre-configuration information further comprises at least one of a number of times of retransmission of the synchronization signal, a number of subframe bitmaps during one discovery period, and information indicating a discovery offset.

12. The UE of claim 8, wherein the at least one processor is further configured to receive, from another UE, system information or a synchronization signal for the D2D communication in a reception resource determined based on another pool list included in the pre-configuration information.

13. The UE of claim 12,
wherein the at least one processor is further configured to:
determine whether a received signal received power (RSRP) of the received synchronization signal is less than a threshold value included in the pre-configuration information, and
transmit, when the RSRP is less than the threshold value, at least one of the system information or the synchronization signal for D2D communication in the transmission resource determined based on the pre-configuration information, and
wherein an identifier (ID) of the transmitted synchronization signal is determined based on the received system information.

14. The UE of claim 13, wherein the received system information comprises information indicating whether the adjacent UE is inside the coverage, and, when the adjacent UE is inside the coverage, the at least one processor is further configured to determine the ID of the transmitted synchronization signal to be identical to an ID of the received synchronization signal.

15. A method for performing device to device (D2D) discovery by a user equipment (UE) in a wireless communication network, the method comprising:
identifying a message including pre-configuration information for D2D discovery message transmission;
determining, by the UE, to operate as a synchronization reference UE when an instruction is received from a base station or a pre-defined condition is satisfied;
in a transmission resource determined based on the pre-configuration information, transmitting, by the UE, a synchronization signal used for synchronization acquisition of a time and a frequency and transmitting system information including transmission timing information of a discovery message; and
transmitting the discovery message in the transmission resource determined based on the pre-configuration information,
wherein the UE exists outside of coverage in which a service is provided by a base station.

* * * * *